(12) United States Patent
Coons et al.

(10) Patent No.: US 6,832,250 B1
(45) Date of Patent: Dec. 14, 2004

(54) USAGE-BASED BILLING AND MANAGEMENT SYSTEM AND METHOD FOR PRINTERS AND OTHER ASSETS

(75) Inventors: Thomas L Coons, Lexington, KY (US);
Robert M Getler, Lexington, KY (US);
R Kent Landry, Lexington, KY (US);
Steven B Rogers, Lexington, KY (US)

(73) Assignee: Lexmark International, Inc., Lexington, KY (US)

( * ) Notice: Subject to any disclaimer, the term of this patent is extended or adjusted under 35 U.S.C. 154(b) by 0 days.

(21) Appl. No.: 09/548,318

(22) Filed: Apr. 13, 2000

Related U.S. Application Data (60) Provisional application No. 60/128,924, filed on Apr. 13, 1999.

(51) Int. Cl.[7] .............................................. G06F 15/173
(52) U.S. Cl. ......................... 709/224; 709/223; 709/203
(58) Field of Search ................................ 709/223, 224, 709/225, 229, 10, 203

(56) References Cited

U.S. PATENT DOCUMENTS

| | | |
|---|---|---|
| 4,167,322 A | 9/1979 | Yano et al. |
| 4,549,044 A | 10/1985 | Durham |
| 4,583,834 A | 4/1986 | Seko et al. |
| 4,586,147 A | 4/1986 | Tadokoro |
| 4,839,829 A | 6/1989 | Freedman |
| 5,016,059 A | 5/1991 | Smeiman |
| 5,057,866 A | 10/1991 | Hill, Jr. et al. |
| 5,084,875 A | 1/1992 | Weinberger et al. |
| 5,117,258 A | 5/1992 | Iwata |
| 5,214,772 A | 5/1993 | Weinberger et al. |
| 5,224,157 A | 6/1993 | Yamada et al. |
| 5,225,997 A | 7/1993 | Lederer et al. |
| 5,258,906 A | 11/1993 | Kroll et al. |
| 5,299,026 A | 3/1994 | Vincett et al. |

(List continued on next page.)

*Primary Examiner*—Mehmet B. Geckil
(74) *Attorney, Agent, or Firm*—Steven J. Elleman, Esq.

(57) ABSTRACT

The present invention provides a method and system for remotely storing usage data associated with monitored assets of an enterprise. A typical system includes a local data store for storing usage data associated with monitored assets of an enterprise. A usage data aggregation system with access to the local data store is used to aggregate data from the monitored assets and to store the aggregated data in the local data store. A local server also with access to the local data store supports the transmission of the stored usage data from the local data store to a remote server. The system will also typically utilize a remote server having access to a remote data store. The remote server is utilized to receive the usage data transmitted by the local server. After receiving the data, the remote server stores it in the remote data store. The usage data residing in either the local data store or the remote data store is available for subsequent access, processing and analysis via the local server and the remote server respectively.

44 Claims, 5 Drawing Sheets

U.S. PATENT DOCUMENTS

| | | |
|---|---|---|
| 5,300,980 A | 4/1994 | Maekawa et al. |
| 5,305,199 A | 4/1994 | LoBiondo et al. |
| 5,333,286 A | 7/1994 | Weinberger et al. |
| 5,339,445 A * | 8/1994 | Gasztonyi .................. 713/324 |
| 5,361,265 A | 11/1994 | Weinberger et al. |
| 5,383,129 A | 1/1995 | Farrell |
| 5,388,211 A | 2/1995 | Hornbuckle |
| 5,398,257 A | 3/1995 | Groenteman |
| 5,438,528 A | 8/1995 | Emerson et al. |
| 5,521,842 A | 5/1996 | Yamada |
| 5,537,550 A | 7/1996 | Russell et al. |
| 5,604,578 A | 2/1997 | Shibuya et al. |
| 5,659,845 A | 8/1997 | Krist et al. |
| 5,694,323 A | 12/1997 | Koropitzer et al. |
| 5,727,156 A | 3/1998 | Herr-Hoyman et al. |
| 5,745,883 A | 4/1998 | Krist et al. |
| 5,752,125 A | 5/1998 | Yamashita et al. |
| 5,761,432 A | 6/1998 | Bergholm et al. |
| 5,787,149 A | 7/1998 | Yousefi et al. |
| 5,862,404 A | 1/1999 | Onaga |
| 5,873,009 A | 2/1999 | Yamashita et al. |
| 5,884,284 A | 3/1999 | Peters et al. |
| 5,933,675 A | 8/1999 | Sawada et al. |
| 5,956,698 A | 9/1999 | Lacheze et al. |
| 5,961,598 A * | 10/1999 | Sime .......................... 709/224 |
| 5,970,477 A * | 10/1999 | Roden ......................... 705/32 |
| 5,974,401 A | 10/1999 | Enomoto et al. |
| 5,987,611 A * | 11/1999 | Freund ....................... 713/201 |
| 5,996,076 A | 11/1999 | Rowney et al. |
| 6,003,069 A | 12/1999 | Cavill |
| 6,003,078 A | 12/1999 | Kodimer et al. |
| 6,012,100 A | 1/2000 | Frailong et al. |
| 6,023,593 A | 2/2000 | Tomidokoro |
| 6,282,567 B1 * | 8/2001 | Finch et al. ................ 709/219 |
| 6,338,085 B1 * | 1/2002 | Ramaswamy ............... 709/217 |
| 6,470,384 B1 * | 10/2002 | O'Brien et al. ............. 709/223 |
| 6,470,387 B1 * | 10/2002 | Fischer ....................... 709/224 |
| 6,513,065 B1 * | 1/2003 | Hafez et al. ................ 709/224 |

* cited by examiner

USAGE-BASED BILLING AND MANAGEMENT SYSTEM AND METHOD FOR PRINTERS AND OTHER ASSETS

CROSS-REFERENCE TO RELATED PATENT APPLICATION

This application claims the benefit, pursuant to 35 U.S.C. §119(e), of applicants' provisional U.S. Patent Application Ser. No. 60/128,924, filed Apr. 13, 1999, entitled "Usage-Based Billing and Management System for Printers and Other Assets", which is hereby incorporated by reference in its entirety.

BACKGROUND OF INVENTION

1. Field of Invention

The present invention relates to a system and method for facilitating Web-based management of assets. More particularly, the invention relates to a system and method for facilitating usage-based billing of assets and overall asset management of printers and other assets.

2. Description of Related Art

The Internet is a global network of connected computer networks. Over the last several years, the Internet has grown in significant measure. A large number of computers on the Internet provide information in various forms. Anyone with a computer connected to the Internet can potentially tap into this vast pool of information.

The most wide spread method of providing information over the Internet is via the World Wide Web (the Web). The Web consists of a subset of the computers connected to the Internet; the computers in this subset run Hypertext Transfer Protocol (HTTP) servers (Web servers). The information available via the Internet also encompasses information available via other types of information servers such as GOPHER and FTP.

Information on the Internet can be accessed through the use of a Uniform Resource Locator (URL). A URL uniquely specifies the location of a particular piece of information on the Internet. A URL will typically be composed of several components. The first component typically designates the protocol by with the address piece of information is accessed (e.g., HTTP, GOPHER, etc.). This first component is separated from the remainder of the URL by a colon (':'). The remainder of the URL will depend upon the protocol component. Typically, the remainder designates a computer on the Internet by name, or by IP number, as well as a more specific designation of the location of the resource on the designated computer. For instance, a typical URL for an HTTP resource might be:

http://www.server.com/dir1/dir2/resource.htm where http is the protocol, www.server.com is the designated computer and /dir1/dir2/resouce.htm designates the location of the resource on the designated computer.

Web servers host information in the form of Web pages; collectively the server and the information hosted are referred to as a Web site. A significant number of Web pages are encoded using the Hypertext Markup Language (HTML) although other encodings using the eXtensible Markup Language (XML) or the Standard Generic Markup Language (SGML) are becoming increasingly more common. The published specifications for these languages are incorporated by reference herein. Web pages in these formatting languages may include links to other Web pages on the same Web site or another. As will be known to those skilled in the art, Web pages may be generated dynamically by a server by integrating a variety of elements into a formatted page prior to transmission to a Web client. Web servers and information servers of other types await requests for the information that they receive from Internet clients.

Client software has evolved that allows users of computers connected to the Internet to access this information. Advanced clients such as NAVIGATOR (Netscape Communications Corporation, Mountain View, Calif.) and Internet Explorer (Microsoft Corporation, Redmond, Wash.) allow users to access software provided via a variety of information servers in a unified client environment. Typically, such client software is referred to as browser software.

The Internet provides infrastructure for a flexible access and delivery of information. This infrastructure offers significant benefits in the area of monitored asset management and billing. Current systems do not take full advantage of such flexibility and benefits.

One known system for managing remotely located document producing devices utilizes a cellular communication network to communicate data including usage data to a central computer. This system typically includes a central computer, a central cellular radio station, and a number of remote document-producing nodes. The central computer generates a copier management command directed towards a selected one of the remote document producing devices, and supplies this command to the central cellular radio station. This radio station then uses a central cellular radio to relay the copier management command to the selected remote copier node. Alternatively, a remote document producing device may initiate a remote management operation by transmitting management data to the central cellular station. Under this approach, usage data associated with document producing devices may be collected for one or more enterprises at a remote central computer. No local storage of the enterprise data occurs and, consequently, cannot be mined or accessed locally but only from the remote central computer.

In several known consumable supply ordering systems, local storage of asset usage data is collected and maintained for the purpose of generating automated or semi-automated consumable supply orders. In one such system, a reprographic machine includes an inventory tracking system for monitoring consumable supplies. Usage data from a plurality of networked reprographic machines is supplied to a single tracking system for monitoring inventories of supplies consumed by the network. Automatic or semi-automatic ordering can be provided via a remote interactive communication system. Order confirmation, projected shipment dates and shipment confirmations can be provided from the reorder site. Systems such as this collect and maintain usage data locally and transmit request for consumables to a remote location but do not publish the locally collected usage data to a remote location for supporting remote mining, access and processing nor for supporting analysis and processing of data across multiple enterprises.

The present invention addresses these and other limitations of such known systems by providing a system and method for remotely storing usage data associated with monitored assets of an enterprise utilizing local data aggregation and staging.

SUMMARY OF THE INVENTION

The present invention is directed to a system and method for remotely storing usage data associated with monitored assets of an enterprise. A typical system according to the present invention will include a local data store for storing usage data associated with monitored assets of an enterprise. A usage data aggregation system with access to the local data store is used to aggregate data from the monitored assets and to store the aggregated data in the local data store. A local server also with access to the local data store supports the transmission of the stored usage data from the local data store to a remote server. In some embodiments, a single computer system may support some or all of the functionality of the local data store, the usage data aggregation system and the local server.

The system will also typically utilize a remote server having access to a remote data store. The remote server is utilized to receive the usage data transmitted by the local server. After receiving the data, the remote server stores it in the remote data store. In some embodiments, the remote data store and the remote server functionality may be supported within a single computer system.

Additional advantages of the invention will be set forth in part in the description which follows, and in part will be obvious from the description, or may be learned by practice of the invention. The advantages of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate one embodiment of the invention and together with the description, serve to explain the principles of the invention.

DETAILED DESCRIPTION OF THE INVENTION

A preferred embodiment of the invention is now described in detail. Referring to the drawings, like numbers indicate like parts throughout the views. As used in the description herein and throughout the claims that follow, the meaning of "a," "an," and "the" includes plural reference unless the context clearly dictates otherwise. Also, as used in the description herein and throughout the claims that follow, the meaning of "in" includes "in" and "on" unless the context clearly dictates otherwise.

In addition, the word "enterprise" shall refer to an organization as a whole or some specifiable subgroup within an organization. The word "asset" shall be construed broadly to include any shared peripheral device including, but not limited to, printers, copiers, facsimile machines, scanners, modems, computers and storage devices.

Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

Figure 1:
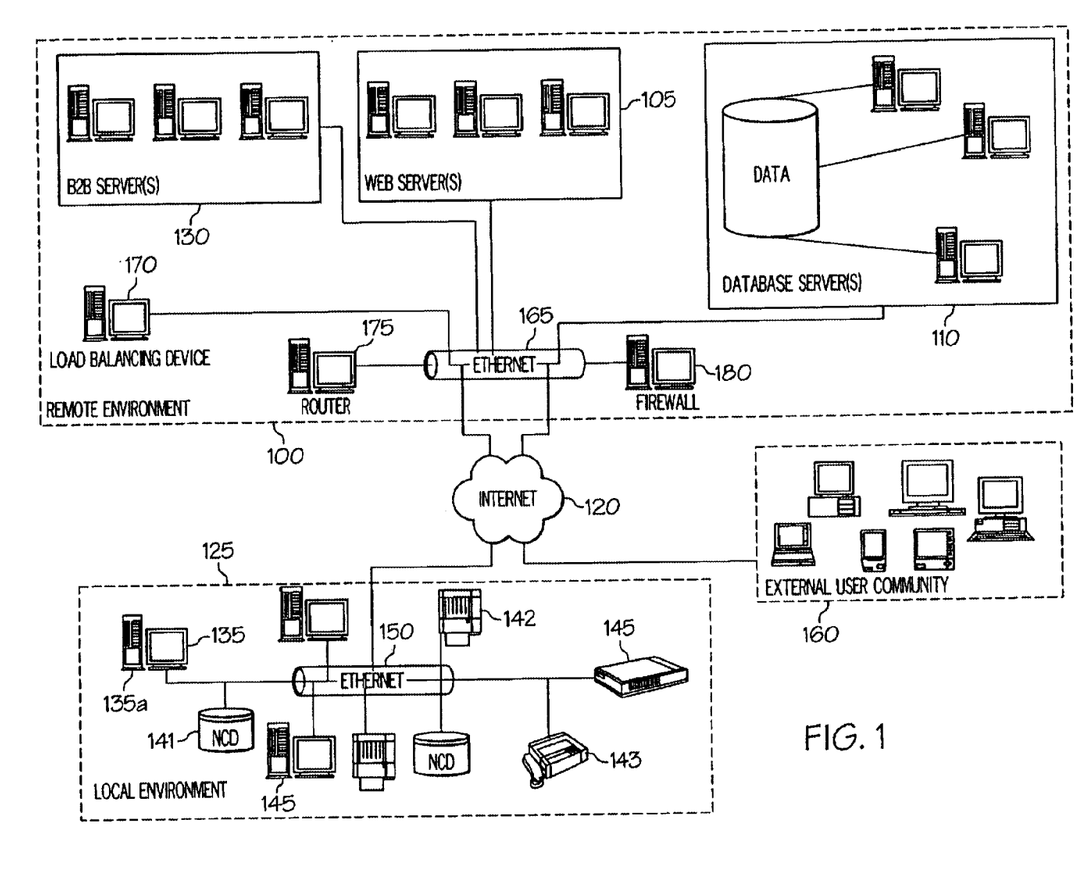
FIG. 1 is a diagram of a typical system according to the present invention.

A typical hardware and software environment for implementing the present invention will be seen in FIG. 1. The local environment 125 will include a local data store 135a for storing usage data associated with monitored assets of an enterprise; in some embodiments, a portion of a monitored asset such as a network connected disk 141 could also serve this function.

A usage data aggregation system with access to the local data store 135a is used to aggregate data from the monitored assets and to store the aggregated data in the local data store. In a preferred embodiment, the usage aggregation system will include hardware such as a computer workstation which is preferably a system with PENTIUM III based processor (Intel Corporation, Santa Clara, Calif.) running usage data aggregation software such as MARKTRACK (Lexmark International, Lexington, Ky.) or similar type software. The software may support interaction with different types of monitored assets, or several software packages may be used in conjunction to aggregate the usage data across the supported asset types.

A local server also with access to the local data store 135a supports the transmission of the stored usage data from the local data store to a remote server. The remote server in a preferred embodiment will include hardware such as a computer workstation preferably with a PENTIUM III based processor (Intel Corporation, Santa Clara, Calif.) running preferably Web server software such as IPLANET Web Server (iPlanet E-Commerce Solutions, a Sun-Netscape Alliance, Mountain View, Calif.), Enterprise Server (Netscape Communications Corporation, Mountain View, Calif.) or Internet Information Server (IIS) (Microsoft Corporation, Redmond, Wash.). In other embodiments, other types of server software such as SMTP or FTP could be used to support the requisite functionality. In some embodiments, a single computer system 135 may support some or all of the functionality of the local data store 135a, the usage data aggregation system and the local server.

The local environment will typically include a communications network such as an ethernet 150 supporting communication between monitored assets such as network connected disk 141, workstation 145, printer 142, scanner 146, facsimile 143, copier (not shown), modem (not shown) and additional monitored assets and the usage data aggregation system. The local environment may further include a firewall system (not shown) and will typically include a router system (not shown). The communications network of the local environment may be connected to a larger scale communications network such as the Internet 120.

The usage aggregation system collects data from the monitored assets and stores this data in the local data store 135a. The data collection may occur in several ways. In a preferred embodiment, monitored assets are registered with the usage aggregation system. Polling of registered, monitored assets may occur on a periodic time basis. Alternatively or additionally, polling of registered, monitored assets may occur as a result of receiving a request at the local server to transmit data to the remote server.

In other embodiments, no registration is required, in such an embodiment, the usage data aggregation system receives usage data from monitored asset without first requesting the data. Monitored assets could transmit data at periodic time intervals where the schedule may vary from asset to asset. Further, monitored assets could transmit data as a result of a trigger event in the asset such as a mechanical failure requiring a service call, low supply of consumables or reaching some predetermined usage threshold. In some embodiments, the occurrence of such a trigger event could further result in forwarding a signal requesting transmission of aggregated data to the local server, thereby triggering the local server to the transmit the aggregated usage data from the local data store to the remote server.

Once aggregated, the usage data is placed in the local data store 135*a*; in some embodiments, the usage data may be encrypted prior to storage in the local data store 135*a*. The local data store may be organized in a variety of ways. The data store may be organized as one or more flat files of data or as one or more hash tables. The data store may in a preferred embodiment be organized as a database with a relational architecture such as provided by an ORACLE database environment (Oracle Corporation, Redwood Shores, Calif.). It will be understood by those of ordinary skill in the art that other architectures such as hierarchical, object-oriented, spatial or other suitable architecture, or combination of architectures, could be used within the scope of the present invention.

The local server including workstation 135 and server software will transmit usage data stored in the local data store 135*a* to the remote server. The local server will retrieve the usage data from the local data store 135*a* and, in some embodiments, encrypt the retrieved usage data prior to transmission to the remote server. In a preferred embodiment, the local server will encode the usage data from the local data store 135*a* in a file using commas to delimit data elements. Other embodiments may utilize encoding formats such as an XML-based encoding, SGML-based encoding or other suitable encoding format to encode the data prior to transmission.

The local server will transmit the usage data utilizing an appropriate transmission protocol such as HTTP, HTTPS (HTTP protocol over a Secure Socket Layer (SSL)), FTP, SMTP, a proprietary transmission protocol or other suitable standard. In a preferred embodiment, a Web server, by itself or in conjunction with a Java servlet, will transmit the usage data using HTTPS, HTTP over a Secure Socket Layer (SSL). The HTTP standard may be accessed through the URL ftp://ftp.isi.edu/in-notes/rfc2616.txt information concerning the state of the development for this standard may be found at URL http://www.w3.org/Protocols/, the specification for SSL may be accessed at URL http://www.netscape.com/eng/ssl3/. These specifications are hereby incorporated by reference in their entireties.

Figure 2:
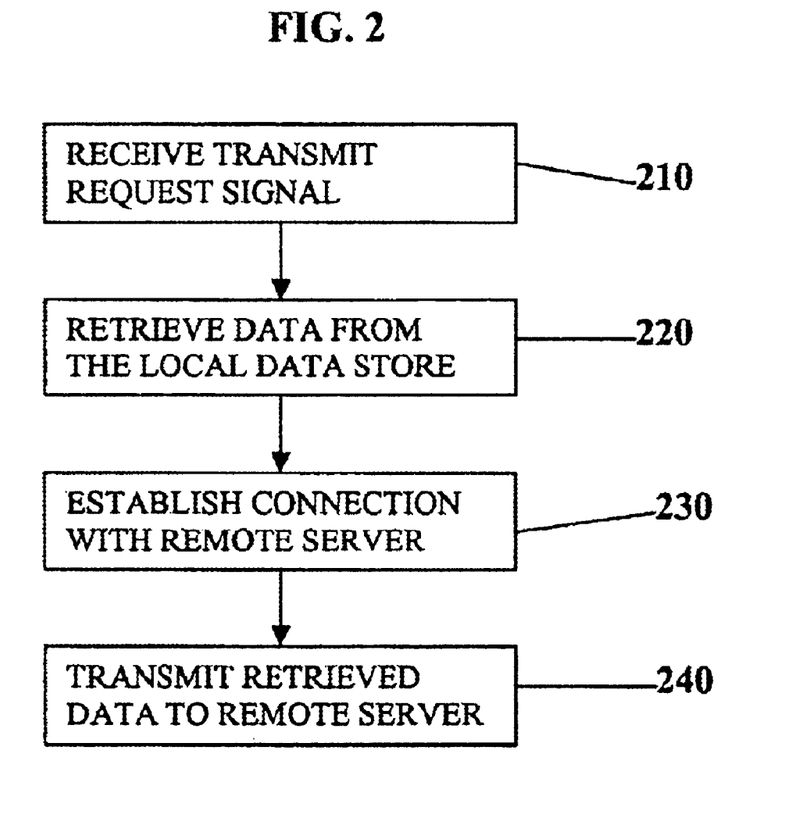
FIG. 2 is a flow chart of steps that could be used in transmitting usage data from the local server to the remote server.

In a preferred embodiment utilizing a Java servlet to aid in the transmission of the usage data, the Web server and the servlet will perform steps as depicted graphically in FIG. 2. Note that the arrows in FIG. 2 indicate one ordering of the steps; other orderings are equally viable within the scope of the present invention.

Figure 4:
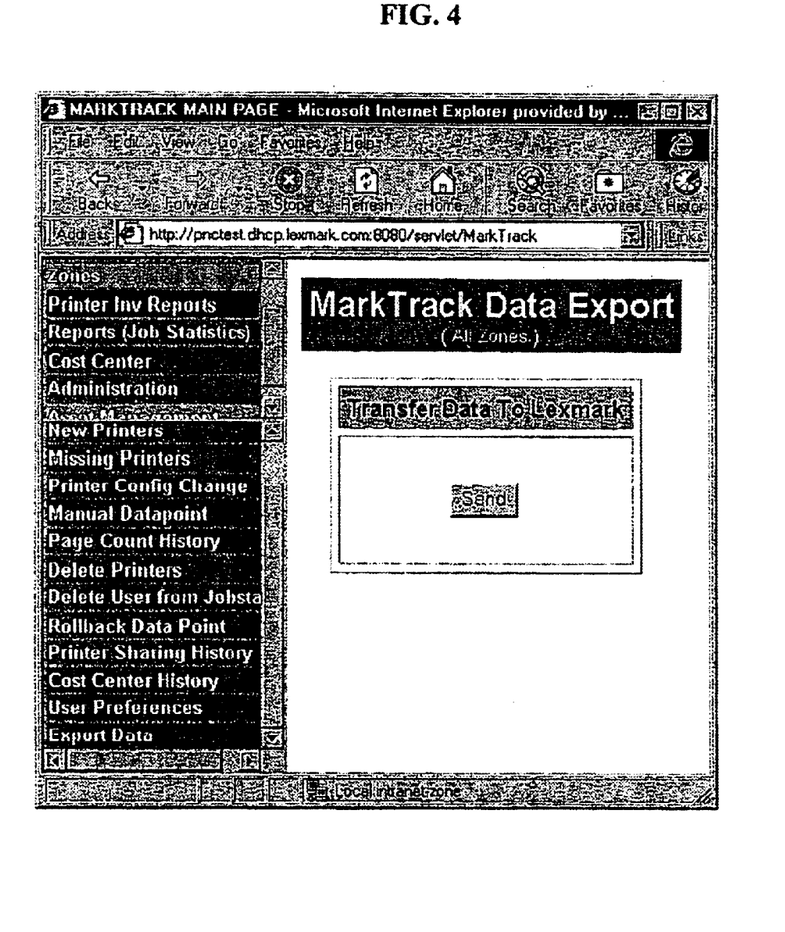
FIG. 4 is a sample screen that could be used to allow the triggering of the transmission of usage data from the local server to the remote server.

In step 210, a signal requesting transmission of the usage data is received by the local server. In a preferred embodiment, this signal is received as a result of the triggering of an active element of a Web page presented by the Web server; FIG. 4 provides an example of such a page. In other embodiments, the signal may result from an event occurring at one of the monitored assets, or the signal could be generated on a periodic time basis. In some embodiments, the remote server may generate and transmit the signal to the local server based upon an event at the remote server or at periodic time intervals. Further, a combination of the aforementioned approaches may be utilized within some embodiments.

In step 220, the usage data is retrieved from the local data store. The way this occurs will vary depending upon the structure of the local data store. In using a Java servlet driven process and a database structure, the servlet could retrieve the data using Java Database Connectivity (JDBC). Use of JDBC to handle interact between Java programs and databases is well known in the art as seen in Chapter 17 of Ivor Horton's *Beginning Java*, Wrox Press Ltd., 1997, pp. 813–864, which is hereby incorporated by reference. In embodiment using other types of applications to retrieve the data, other database connectivity interfaces such as ODBC may be used.

In step 230, the local server establishes a connection to the remote server via one or more communications channels such as ethernet 150, Internet 120 and ethernet 165. As will be known to those of skill in the art, a variety of other communication channels such as dial up connection, dedicated line, etc. could be used within the scope of the present invention.

In step 240, the data is transmitted to the remote server using one of the protocols discussed above. The transmission may involve formatting the data in an encoding format, or the encoding may occur at the retrieval step 220. Encryption of the data may also occur at steps 220 or 240. In a preferred embodiment, the data is formatted either at retrieval or at transmission as a comma separated data file and is transmitted using HTTPS (HTTP protocol over an SSL connection).

The system will also typically utilize a remote environment 100 including a remote server having access to a remote data store 110. The remote server, in some embodiments, may include multiple hardware and software elements. The hardware element, or elements, will typically include at least one computer system preferably including at least one file server capacity processor such as a PENTIUM III based processor (Intel Corporation, Santa Clara, Calif.). The remote server is utilized to receive the usage data transmitted by the local server. After receiving the data, the remote server stores it in the remote data store. In some embodiments, the remote data store and the remote server functionality may be supported within a single computer system.

In addition, the local server may receive requests from requestors for aggregated usage data. For instance, a manager within the enterprise may wish to view the aggregated usage data associated with the monitored assets. The request, in some embodiments, could occur through the access of a Web server that could be included as part of the local server. The local server would respond by retrieving the usage data from the local data store and sending the retrieved data to the requester, or a destination specified by the requester. The local server may also format the data prior to transmission; for instance, the data may be formatted as a Web page for viewing by the requestor. In addition to the transmission of usage data, the local server may transmit or provide access to reports concerning the usage data in the local and/or remote data stores as more fully described below. A requestor may be from an external user community 160, from within the remote environment 100 or from within the local environment 125; the origin of the requestor may be used as a criteria in determining the requestor's level of access to usage data.

Referring to FIG. 1, the remote environment 100 will include a remote server and a remote data store. In a preferred embodiment, the remote server includes a Web server cluster 105 of one or more Web servers such as IPLANET Web Server (iPlanet E-Commerce Solutions, a Sun-Netscape Alliance, Mountain View, Calif.), Enterprise Server (Netscape Communications Corporation, Mountain View, Calif.) or Internet Information Server (IIS) (Microsoft Corporation, Redmond, Wash.) and a business to business (B2B) cluster 130 of one or more B2B servers such as B2B Integration Servers (webMethods, Inc., Fairfax, Va.).

The remote server, in a preferred embodiment may also include a cluster of one or more application servers (not shown). Application servers may host the presentation logic like JavaServer Pages (JSP), Active Server Pages (ASP), etc. and the business logic like Enterprise Java Beans (EJB), COM, COM+, CORBA, etc. In such an embodiment, the web servers in the Web server cluster 105 handle the HTTP Request/Response and hand off processing and/or formatting to an application server. The application server(s) actually controls the logic for processing.

In other embodiments, the B2B functionality of the B2B cluster 130 and the application server functionality of the application server cluster may be handled directly by the Web server(s) in the Web server cluster 105. In such an embodiment, the B2B cluster provides services functionality for supporting business to business operation while the Web servers provides Web pages for providing information and human-computer interfaces. In a preferred embodiment, interfaces to the services provided by the B2B cluster are specified in machine interpretable form such as through an XML-based definition language such as the Web Interface Definition Language (WIDL), whose specification can be found on the Internet through URL http://www.w3.org/TR/NOTE-widl, which is hereby incorporated by reference in its entirety.

The environment 100 may also include a communications network such as ethernet 165 to facilitate communication between the remote server and the remote data store 110. A communications channel such as ethernet 165, Internet 120 and ethernet 150 may be used to allow communication between the remote server and the local server. The environment 100 may also include load balancing device 170 to distribute requests among the clusters and/or among the servers with the clusters, router system 175 to control routing within ethernet 165 and firewall system 180 to provide security for systems connected to ethernet 165.

In a preferred embodiment the remote data store includes a database system cluster 110 of one or more database systems. These database system may in a preferred embodiment be organized as relational database(s) such as provided by an ORACLE database environment (Oracle Corporation, Redwood Shores, Calif.). Those of ordinary skill in the art will readily understand that other database architectures such as hierarchical, object-oriented, spatial or other suitable architecture, or combination of architectures, could be used within the scope of the present invention. In other embodiments, the local data store may be organized in a variety of other ways. The data store may be organized as one or more flat files of data or as one or more hash tables. The functionality of the remote server and the remote data store may in certain embodiments be performed by a single computer system.

Figure 3:
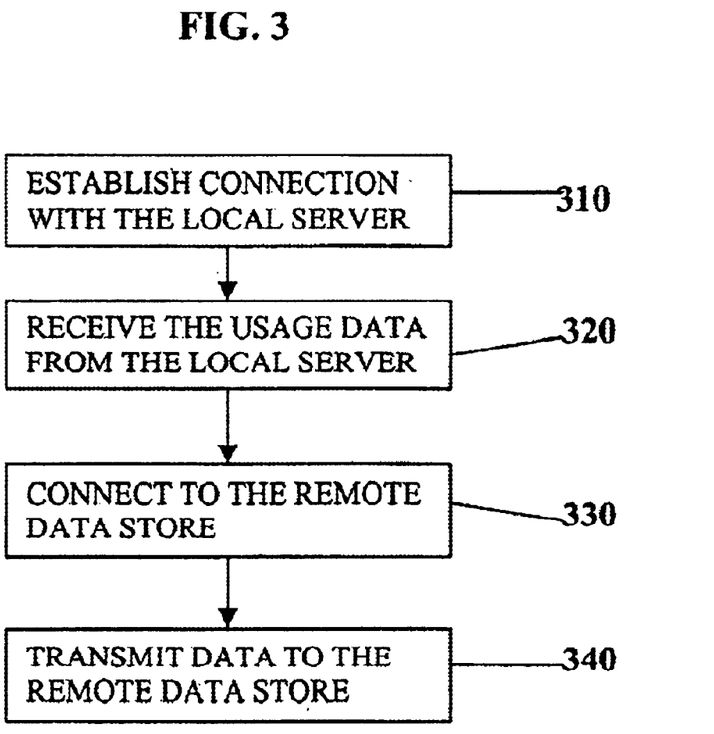
FIG. 3 is a flow chart of steps that could be used in receiving usage data from the local server and storing the received data in the remote data store.

In a preferred embodiment, the Web server cluster 105, the B2B server cluster 130 and the database server cluster 110 will perform steps as depicted graphically in FIG. 3.

Note that the arrows in FIG. 3 indicate one ordering of the steps; other orderings are equally viable within the scope of the present invention.

In step 310, a connection is established between the remote server and the local server. In a preferred embodiment, the connection is initiated by the local server; however, this need not be true in other embodiments. A connection between the remote server and the local server may be formed via one or more communications channels such as ethernet 150, Internet 120 and ethernet 165. As will be known to those of skill in the art, a variety of other communication channels such as dial up connection, dedicated line, etc. could be used within the scope of the present invention. In a preferred embodiment, the connection is established with a B2B server, within the B2B cluster 130, having a particular service designed to receive the usage data. In such an embodiment the data is received via the HTTPS protocol (HTTP protocol over an SSL connection).

In step 320, the usage data is received from the local server. In some embodiments, the usage data is decrypted as part of the receiving process. In the preferred embodiment, the invoked reception service receives the data transmitted by the Java servlet transmitter running as part of the local server.

In step 330, the remote server connects to the remote data store. In an embodiment where the remote server and remote data store reside on the same computer system, this connection may be a serial bus or other suitable channel of communication. In a preferred embodiment, the B2B reception service establishes a connection with one of the database systems in the database cluster 110 utilizing JDBC.

In step 340, the remote server transmits the data to the remote data store. Where the remote server and the remote data store reside on the same computer system, the transmission may be effectuated via a write operation to the data store or through an ODBC, JDBC or similar connectivity interface. The format of the transmission will vary depending upon the organization of the data store. For instance, if the remote data store in a particular embodiment is organized as a set of one or more flat files, the transmission may utilize and FTP protocol put transaction to transmit the usage data to the remote data store. In a preferred embodiment, the B2B reception service formats the received data in the form of an SQL insertion statement and forwards the insertion to one of the database systems in the database cluster via JDBC.

In addition, the remote server may receive requests from requestors for aggregated usage data. For instance, a billing company may wish to generate an invoice based on aggregated usage data associated with the monitored assets of an enterprise. The request, in some embodiments, could occur through the access of a Web server that could be included as part of the remote server. The remote server would respond by retrieving the usage data from the remote data store and sending the retrieved data to the requestor, or a destination specified by the requester. In some embodiments, the remote data store may send a transmission request signal to the local server associated with the enterprise for which the requester is requesting usage data prior to retrieving the usage data from the remote data store. The remote server may also format the data prior to transmission; for instance, the data may be formatted as a Web page for viewing by the requester. In some embodiments, a separate request for downloading the retrieved data may be required. In a preferred embodiment, a flat file of usage data is generated for downloading by the requestor. In addition to the transmission of usage data, the remote server may transmit or provide access to reports concerning the usage data in the remote data store as more fully described below. A requestor may be from an external user community 160, from within the remote environment 100 or from within the local environment 125; the origin of the requester may be used as a criteria in determining the requestor's level of access to usage data.

Figure 5:
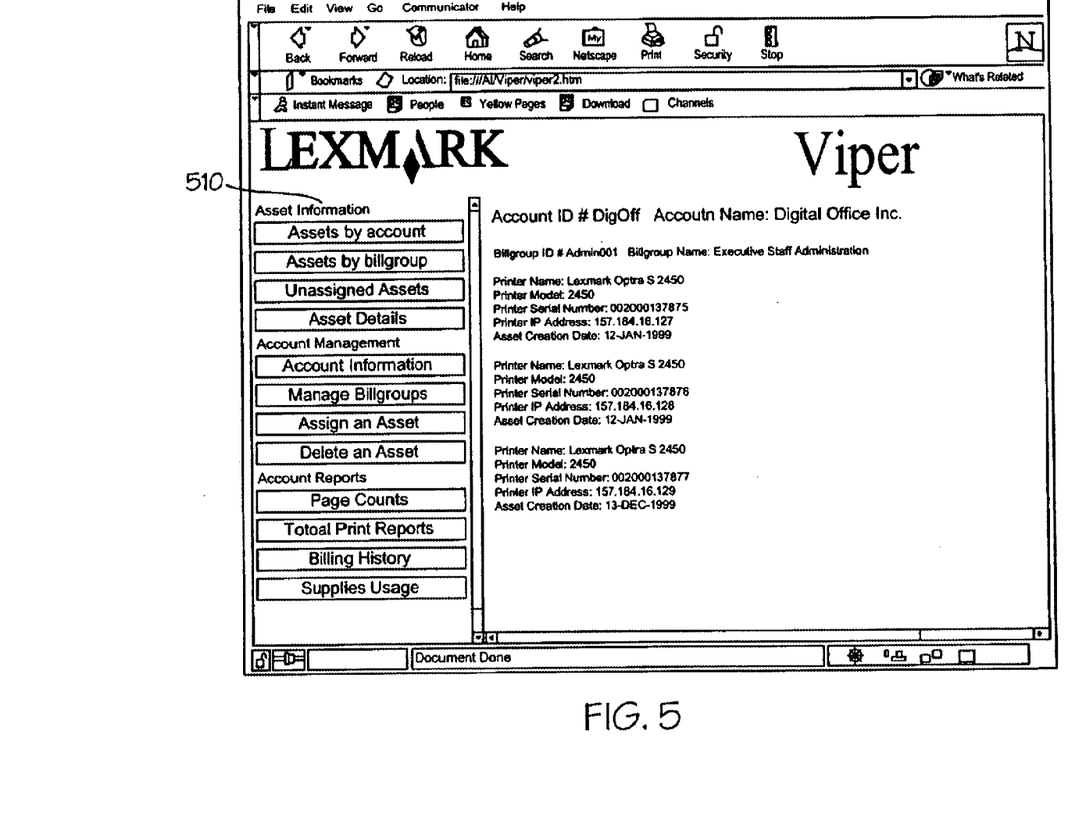
FIG. 5 is a sample screen displaying a typical report request interface.

The local and/or the remote servers may also support the ability to generate reports concerning the usage data collected. Typically, the local or remote server will generate reports based upon the usage data in the local or remote store, respectively; however, in some embodiments, the local server may access and generate reports based upon data in the remote data store. Further, in some embodiments, the remote server may generate reports based upon usage data in the local store. Report generation will typically occur as a result of a request for a report; FIG. 5 provides a sample screen showing a Web page including an interface 510 that could be used to generate report requests.

The generated reports may serve a variety of purposes including billing, asset utilization analysis and automated ordering of consumables used by monitored assets. Billing reports such as invoices may be generated and presented in a variety of manners. Billing reports, in a preferred embodiment, may be generated on demand or on a periodic basis by, for example, a Finance Company in the following manner:

1. Finance Company accesses a Web page from a Web server of the Web server cluster 105.

2. Finance Company clicks button on a page after selecting an enterprise for which a report is to be generated.

3. The button invokes a service on a B2B server of the B2B server cluster 130.

4. That service executes stored procedures on database server cluster 110 to extract the usage data associated with the selected enterprise.

5. The usage data is wrapped and compressed into a file.

b 6. The file is then made available in compressed or uncompressed form for download to the Finance Company through a Web page served by a Web server of the Web server cluster 105.

A consumable supply company could utilize a similar process for generating automated or semi-automated orders for supplies from the enterprise. The usage data extracted would not be directed towards usage based payment but would be analyzed to determine the level of consumable supplies associated with the various monitored assets of the enterprise.

In the case of utilization reports, Web screens are provided that allow a requestor to evaluate the data and make assessments. For example, assume there are two assets on a network that are being supported by 25 people. Two aisles separate both assets.

A utilization analysis report based upon usage data could establish that one asset is being utilized 10 times as hard, probably meaning people waiting for the asset to finish printing. This example could suggest to the requester an upgrade of the asset to provide more pages/per/minute might be needed.

This type of assessment can be technically feasible by the following:

1. The end-user from the external community 160, from the local environment 125 or from the remote environment 100 who needs access to the data is presented with an interface allowing him to select utilization report generation.

2. The selection invokes a service on a B2B server of the B2B server cluster 130 that extracts the data from a database of the database cluster 110.

3. The B2B server of the B2B server cluster 130 dynamically generates the XML formatted usage data.

4. A Web server from the Web server cluster 105 makes the data available to the requestor in a variety of ways including, but not limited to:

a) encoding (using HTML Form Encoding) the data as hidden HTML form fields and posts it to a URL that formats the data as a page, b) creating an HTML form on the web server that contains an XML document, c) breaking out the data and filling in an HTML table on the Web server, or d) exporting the data into another suitable format for viewing and analysis such as a spreadsheet like Exel (Microsoft Corporation, Redmond, Wash.) or an alternative database format like Access (Microsoft Corporation, Redmond, Wash.).

5. The Web server presents the data to the requestor's browser either directly as HTML or data viewable through a browser plug-in. Alternatively, the data may be made available in a file for download and may subsequently be viewed and processed via application software such as spreadsheet software or database software.

Additional advantages of the invention will be set forth in part in the description which follows, and in part will be obvious from the description, or may be learned by practice of the invention. The advantages of the invention will be realized and attained by means of the elements and combinations particularly pointed out in the appended claims. It is to be understood that both the foregoing general description and the following detailed description are exemplary and explanatory only and are not restrictive of the invention, as claimed.

Throughout this application, various publications may have been referenced. The disclosures of these publications in their entireties are hereby incorporated by reference into this application in order to more fully describe the state of the art to which this invention pertains.

The embodiments described above are given as illustrative examples only. It will be readily appreciated that many deviations may be made from the specific embodiments disclosed in this specification without departing from the invention. Accordingly, the scope of the invention is to be determined by the claims below rather than being limited to the specifically described embodiments above.

What is claimed is:

1. A method for remotely storing usage data aggregated from at least one monitored asset associated with an enterprise, the method comprising the steps of:

aggregating usage data from at least one monitored asset associated with an enterprise wherein the aggregating step includes receiving usage data from at least one monitored asset associated with the enterprise;

storing the aggregated usage data in a local data store;

receiving, by a local server, a signal requesting transmission of stored usage data wherein said signal originates from one of the at least one monitored assets;

in response to the received signal transmitting by the local server the stored usage data from the local data store to a remote server;

receiving the stored usage data by the remote server; and storing the received usage data in a remote data store.

2. The method of claim 1, and further comprising the step of generating a report based upon the usage data in the remote data store.

3. The method of claim 2, wherein the generated report in the step of generating a report is a billing report.

4. The method of claim 2, wherein the generated report in the step of generating a report is an asset utilization report.

5. The method of claim 2, wherein the remote server generates the report based upon the usage data in the remote data store.

6. The method of claim 2, wherein the local server generates the report based upon the usage data in the remote data store.

7. The method of claim 2, wherein the local server generates the report based upon the usage data in the local data store.

8. The method of claim 1, and further comprising the steps of receiving from a requestor by the remote server a request for data associated with the enterprise and, in response to the received request, transmitting to the requestor the usage data in the remote store aggregated from the at least one monitored asset associated with the enterprise.

9. The method of claim 8, and further comprising the step of transmitting to the requester an asset utilization analysis for the at least one monitored asset associated with the enterprise based on the usage data in the remote store aggregated from the at least one monitored asset associated with the enterprise.

10. The method of claim 1, and further comprising the step of registering each monitored asset in the enterprise for which usage data is to be aggregated.

11. The method of claim 10, wherein the step of aggregating further comprises the step of polling the usage data from each registered monitored asset.

12. The method of claim 11, wherein the step of polling occurs at periodic time intervals.

13. The method of claim 11, and further comprising the step of receiving by the local server signal requesting transmission of stored usage data, wherein the step of transmitting the stored usage data occurs in response to the received signal requesting transmission and wherein the step of polling occurs upon receipt of the signal requesting transmission.

14. The method of claim 1, wherein the local data store in the step of storing the aggregated usage data is a flat file.

15. The method of claim 1, wherein the local data store in the step of storing the aggregated usage data is a database.

16. The method of claim 15, wherein the local data store in the step of storing the aggregated usage data is a relational database.

17. The method of claim 1, wherein the step of storing the aggregated usage data comprises encrypting the aggregated usage data.

18. The method of claim 1, wherein the step of transmitting the stored usage data comprises the step of retrieving the stored usage data from the local data store.

19. The method of claim 18, wherein the step of transmitting the stored usage data further comprises the step of encoding the retrieved data using a predetermined data format.

20. The method of claim 19, wherein the predetermined data format used in the step of encoding the retrieved data is XML-based.

21. The method of claim 19, wherein the step of encoding the retrieved data using a predetermined format comprises the step of encoding the retrieved data in a comma separated text file.

22. The method of claim 18, wherein the step of transmitting the stored usage data further comprises the step of encrypting the retrieved data.

23. The method of claim 1, wherein the step of transmitting the stored usage data comprises the step of transmitting the stored usage data in the form of an HTTP response.

24. The method of claim 1, wherein the step of transmitting the stored usage data. comprises the step of transmitting the stored usage data in the form of an HTTPS response.

25. The method of claim 1, wherein the step of transmitting the stored usage data comprises the step of transmitting the stored usage data via an SSL connection.

26. The method of claim 1, wherein the step of transmitting the stored usage data occurs at periodic time intervals.

27. The method of claim 1, wherein the step of receiving the stored usage data comprises the step of decrypting the stored usage data.

28. The method of claim 1, wherein the step of storing the received usage data in a remote data store comprises transmitting the received usage data to the remote data store.

29. The method of claim 1, wherein the remote data store in the step of storing the received usage data is a database.

30. The method of claim 29, wherein the remote data store in the step of storing the received usage data is a relational database.

31. The method of claim 29, wherein the remote data store in the step of storing the received usage data is an object-oriented database.

32. A system for remotely storing usage data aggregated from at least one monitored asset associated with an enterprise, the system comprising;

a) a local data store;
   b) a remote data store;
   c) a usage data aggregation system in communication with at least one monitored asset associated with an enterprise and the local data store, the usage data aggregation system comprising an aggregation processor for performing the steps comprising;
      i) aggregating usage data from the at least one monitored asset associated with the enterprise; and
      ii) storing the aggregated usage data in the local data store;
   d) a local server in communication with the local data store, the local server comprising a local server processor; and
   e) a remote server in communication with the local server and the remote data store, the remote server comprising a remote server processor for performing the steps comprising;
      i) receiving the stored usage data from the local server; and
      ii) storing the received usage data in the remote data store; and
   wherein the local server processor performs the step comprising of transmitting the stored usage data from the local data store to the remote server in response to a signal requesting transmission of stored usage data that originates from one of the at least one monitored assets.

33. The system of claim 32, wherein the remote server processor performs the further step comprising of generating a report based upon the usage data in the remote data store.

34. The system of claim 33, wherein the generated report is a billing report.

35. The system of claim 33, wherein the generated report is an asset utilization report.

36. The system of claim 32, wherein the local server processor performs the further step comprising of generating a report based upon the usage data in the remote data store.

37. The system of claim 32, wherein the local server processor performs the further step comprising of generating a report based upon the usage data in the local data store.

38. The system of claim 32, wherein the remote server processor performs the further steps comprising of receiving from a requestor a request for data associated with the enterprise and, in response to the received request, transmitting to the requestor the usage data in the remote store aggregated from the at least one monitored asset associated with the enterprise.

39. The system of claim 32, wherein the local server processor performs the further steps comprising of receiving from a requestor a request for aggregated usage data and, in response to the received request, transmitting to the requester the aggregated usage data in the local store.

40. The system of claim 32, wherein a single computer system hosts the usage data aggregation system and the local server.

41. The system of claim 40, wherein the single computer system further hosts the local data store.

42. The system of claim 32, wherein a single computer system hosts the usage data aggregation system and the local data store.

43. The system of claim 32, wherein a single computer system hosts the local server and the local data store.

44. The system of claim 32, wherein a single computer system hosts the remote server and the remote data store.

* * * * *